May 3, 1966 J. A. BOURGET 3,249,766

SHIFT REGISTERS EMPLOYING TUNNEL DIODES AND PARTICULAR GATING MEANS

Filed Aug. 23, 1963 3 Sheets-Sheet 1

INVENTOR

J. ANDRE BOURGET

BY William D. Roberson

ATTORNEY

INVENTOR
J. ANDRE BOURGET

BY William D. Roberson
ATTORNEY

INVENTOR
J. ANDRE BOURGET
BY William D Roberson
ATTORNEY

United States Patent Office 3,249,766

Patented May 3, 1966

3,249,766

SHIFT REGISTERS EMPLOYING TUNNEL DIODES AND PARTICULAR GATING MEANS

Joseph Andre Bourget, Baltimore, Md., assignor to Martin Marietta Corporation, New York, N.Y., a corporation of Maryland Filed Aug. 23, 1963, Ser. No. 304,135
8 Claims. (Cl. 307—88.5)

This invention relates to electrical shift registers and more particularly to high speed shift registers employing so-called Esaki or tunnel diodes in bistable modes of operation.

Generally, shift register circuits include an ordered array or series of stages in which information may be stored in accordance with a code, the coded information being represented by a particular and corresponding pattern of states of the stages. Information in a shift register circuit is represented in digital fashion and each stage in the array is given a condition which characterizes either a digit or the absence of a digit, corresponding respectively to a "1" or a "0." By convention, a digit or a "1" is usually equated to an ON or energized condition of a load associated with one of the register stages, while the OFF or deenergized condition of the load corresponds to a zero or the absence of a digit. The shift register circuit operates in response to shift signals applied at spaced time intervals, so that subsequent to the application of the shift signal a digit is registered in each stage next adjacent the stage where a digit had previously been registered and the absence of a digit is registered in those stages next adjacent the stages where previously the absence of a digit had been registered. When a shift signal is applied, therefore, the condition existing at any stage is shifted to the next stage and, once a pattern has been established in the shift register circuit, each succeeding shift signal transfers that pattern by one step in a forward direction along the array of stages.

It is an object of this invention to provide improved shift register circuits making use of tunnel diodes and operating at much higher switching or shift speeds than have previously been possible with prior shift register circuits employing vacuum tubes or transistors.

It is a further object of this invention to provide shift register circuits employing in each of their stages a high-speed bi-stable diode having negative resistance characteristics and, together with each such bi-stable diode, a relatively small number of auxiliary circuit elements.

A still further object of this invention is to provide a novel high-speed shift register circuit having a unique mode of sampling an input signal and shifting the information supplied by it between successive stages to take advantage of the inherent speed of operation of the basic switching elements in each stage of the array.

Yet another object of the invention is the provision of high-speed shift register circuits having bi-stable stages constructed with but a small number of auxiliary circuit elements to complement the basic switching elements in each stage.

From the foregoing it will be apparent that the invention contemplates the provision of shift register circuits of simplified design with bi-stable stages capable of shifting the information stored within the array of stages at high speed.

By way of a brief summary of this invention in one of its aspects a shift register circuit is provided in which each stage in the array includes a tunnel diode connected in series with a resistor across a source of direct current potential. The potential source and the resistor bias the tunnel diode to operate in a bi-stable switching manner between ON and OFF states. Digital input signals applied to each stage are passed first through a time delay network and then through a gate circuit which controls the switching intervals of the tunnel diode. Each gate circuit incorporates a pair of diodes connected in parallel with opposite polarities. To control the intervals during which the incoming signals from each stage are permitted to reach and affect the state of the tunnel diode, a shift signal source applies to the bi-polar double diode gate circuit a shift signal of alternating polarity which at a predetermined repetition rate opens the gate circuit to the passage of the incoming digital signals. The array of stages is cascaded to provide the output signal of each stage as an input signal to the next succeeding stage in the array. By such arrangements I have constructed and operated tunnel diode shift registers at shift rates of 1000 megacycles. There is good reason to predict that clock or shift rates of even higher frequencies are attainable through the practice of this invention.

Although the scope of the invention in its broader aspects is not to be limited except by a proper interpretation of the appended claims, further details of the invention as well as additional objects and advantages will be better understood in connection with the accompanying drawings in which:

Figures 1, 2, 3, 5:
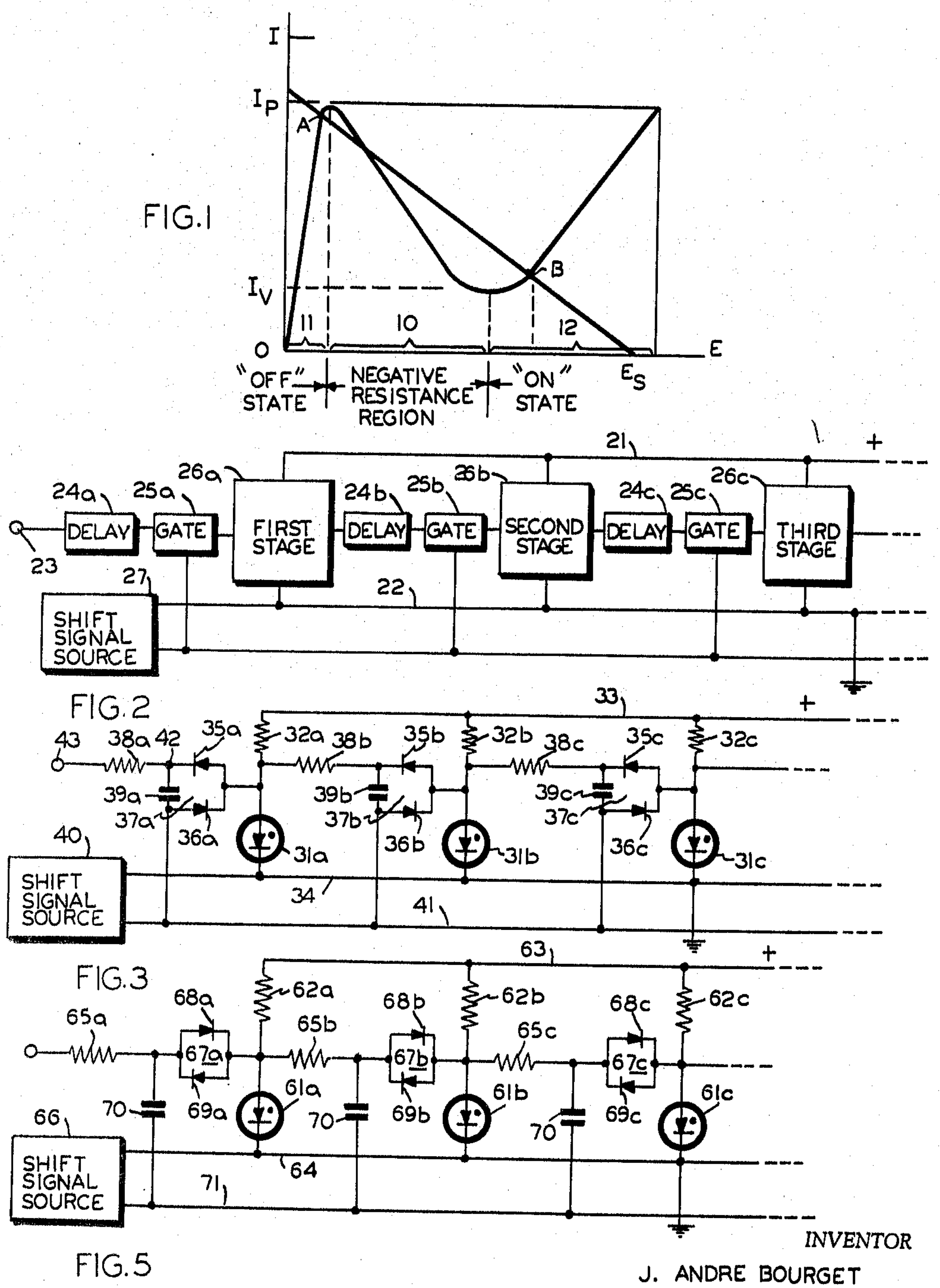
FIGURE 1 is a characteristic curve of a typical tunnel diode, illustrating its operation as a switch.
FIGURE 2 is a block diagram of a shift register circuit constructed in accordance with this invention, illustrating the general functional operations of the various portions of the circuit.
FIGURE 3 is a schematic diagram of a simplified shift register constructed in accordance with this invention.
FIGURE 5 is a schematic diagram of an alternate form of shift register circuit constructed in accordance with this invention.

The circuits to be described more completely hereinafter make use of tunnel diodes connected to operate in bi-stable modes. In FIGURE 1, which illustrates the characteristic curve of a typical tunnel diode, three portions of the curve are indicated, the central portion 10 being the negative resistance region. Under certain circuit conditions the negative resistance region of the tunnel diode characteristic can be made an un-stable region and the tunnel diode can be made to switch through the negative resistance portion of its characteristic curve to opposite bi-stable conditions represented by regions 11 and 12. By convention, the low voltage state represented by region 11 of the characteristic curve is considered the OFF state of the tunnel diode and represents a zero bit of information. The high voltage state represented by region 12 is deemed to be the ON state, representing a 1 bit. Switching between these states can be accomplished if the total circuit positive resistance is larger than the tunnel diode's negative resistance. In such a case if the potential applied across the circuit is held constant at a value represented by $E_s$ on the curve, the tunnel diode can be switched from Point A to Point B on the curve by a forward potential pulse applied across the tunnel diode, the pulse being of sufficient magnitude that it would tend to increase the tunnel diode current to a value in excess of its peak current $I_p$. Reverse switching from Point B to Point A is accomplished by applying a backward potential pulse of sufficient magnitude to reduce the tunnel diode current to a value less than the valley current $I_v$. Such is the manner of switching employed in the tunnel diode circuits described herein.

Turning now to FIGURE 2, the shift register represented therein is seen to be in the form of a regular array of stages, only three of which are shown, connected in sequence with a delay circuit and a gate circuit between each stage. Power to operate the shift register is supplied by a source of direct current potential connected across a pair of conductors 21 and 22. Each of the stages connected across the power supply is capable of being switched between different ON or OFF states by the signals applied thereto. A signal introduced as an input to terminal 23 is delayed a predetermined period of time by delay circuit 24*a* and then applied to gate circuit 25*a*. Depending upon the condition of the gate circuit 25*a*, the information contained in the input signal is then passed to the first stage 26*a*. The information conveyed to the first stage is then recorded within that stage until the condition of the signal introduced at the input is changed. The shift signal source 27 is connected to control each of the gates 25*a*, 25*b* and 25*c*, so that upon application of the correct shift signal, not only is each stage caused to pass the information contained within it to the next succeeding stage, but each stage is also rendered receptive to input signals applied through its associated delay and gate circuits. Thus the output of the first stage 26*a* becomes the input signal for the second stage 26*b* and the output signal for the second stage 26*b* becomes the input signal for the third stage 26*c*. Any number of stages can be cascaded for the purpose of storing any digital word, the number of bits which can be recorded at any time being limited only by the number of stages in the shift register circuit.

In FIGURE 2 as in the following schematic diagrams, wherever the same reference number is employed to designate identical elements in or associated with each stage of the shift register, lower case letters *a*, *b* and *c* are also employed to associate these elements with their respective stages. It is to be understood, of course, that although but three stages are shown in each of the illustrations described herein, in actual practice shift register circuits will usually have many more serially connected stages.

In the circuit diagram of FIGURE 3, each stage of the shift register circuit is seen to incorporate a tunnel diode 31 and a resistor 32 connected in series across a source of direct current potential represented by conductors 33 and 34. The tunnel diodes are connected on the ground potential side of the series combination and the opposite end of the resistor 32 is connected to the positive side of the power source. The input gate circuit to each tunnel diode is seen to include a pair of parallel connected circuits branches having diodes 35 and 36 connected with opposite polarities. That is, the diodes are arranged to conduct in opposite directions and form in combination a series of double diode circuits 37*a*, *b* and *c*. The input signal to the shift register is applied to resistor 38*a*, which functions in cooperation with capacitor 39*a* to delay the signal applied to the double diode gate circuit. As has been described, an input signal pulse of the proper polarity and magnitude, when applied through the double diode gate circuit 37*a* can trigger the tunnel diode 31*a* from its OFF to its ON state or vice versa, the digit 1 being represented by the ON condition, and the OFF condition representing zero.

Unless a proper enabling signal is applied, however, to the double diode gate circuit, the polarity of the diode 35*a* will prevent the input signal from reaching the tunnel diode 31*a*. The enabling signal, which is normally applied at a constant clock rate, is supplied by shift signal source 40 not only to the double diode gate circuit 37*a*, but also to each of the succeeding gate circuits 37*b* and 37*c*. The shift signal is of alternating polarity and functions in this case to supply an ON signal and an OFF signal through conductor 41 to the gate circuits of all stages simultaneously, the ON signal leading the OFF signal by a small fraction of a bit of information. The ON portion of the shift signal in this embodiment reaches the tunnel diode at all times through diode 36*a* and will always switch tunnel diode 31*a* to its ON condition. The OFF portion of the shift signal can be opposed in the gate circuit by an incoming positive pulse through resistor 38*a*. This would reverse bias diode 35*a* and prevent the tunnel diode from being switched OFF. If a zero input signal appears at point 42 in the circuit, a positive pulse from the shift signal source 40 will pass through diode 36*a* and momentarily increase the potential across tunnel diode 31*a* to turn it on. However the next succeeding negative pulse will be transmitted through diode 35*a* and will lower the potential across the tunnel diode 31*a* to a value which turns the tunnel diode OFF to represent a zero bit of digital information. The situation is different, however, when a positive input signal appears at point 42. Then, due to the reverse bias on diode 35*a* the negative OFF pulse will be insufficient to overcome the reverse bias and tunnel diode 31*a* will remain ON, thereby representing in the first stage the 2 bit of digital information presented to it through the input circuit. The first stage will therefore switch ON and stay ON until the gate again renders conductive to the OFF signal. Each stage of the shift register controls the gate to the next succeeding stage through a delay network in such a way that the opening of the gate to the next stage occurs after its immediately preceding or controlling stage has changed state.

Figure 4:
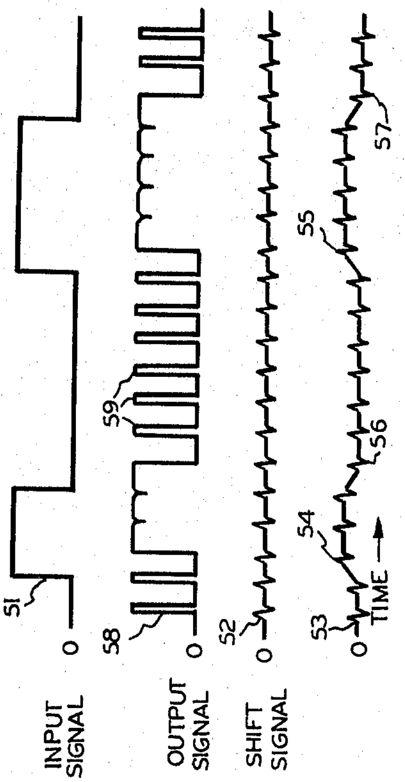
FIGURE 4 is a diagrammatic representation on a common time scale of certain potentials appearing at selected points in the circuit illustrated in FIGURE 3.

The circuit of FIGURE 3 should be considered in connection with FIGURE 4 which represents on a common time scale certain potentials appearing at selected points in the FIGURE 3 circuit, all potentials being referred to ground. The input signal 51 applied to terminal 43 in FIGURE 3 is shown to consist of positive pulses having a width and separation representative of certain information to be stored. The shift signal 52 produced by source 40 consists of a series of positive and negative pulses occurring at a regular clock rate defining the shift rate of the circuit. In FIGURE 3 resistor 38*a* and capacitor 39*a* form a delay network, the time period of which is longer than a positive and negative shift signal pulse, but shorter than the interval or period between such pulses. Resistor 38*a* and capacitor 39*a* also form a steering system to diode 35*a* to permit the OFF pulses to be controlled.

The combination of shift or clock signals 52 and input signals 51 produces at point 42 in the FIGURE 3 circuit a combined signal of the nature represented by waveform 53 in FIGURE 4. The nature of this combined signal is such that positive pulses 54 and 55 are of sufficient magnitude to turn the first stage of the register ON and the negative pulses 56 and 57 are sufficiently negative to turn that stage OFF. Consequently the potential appearing across tunnel diode 31*a* as an output signal is represented by curve 58.

It can be noted that the waveform of the information input signal appearing across tunnel diode 31*a* is similar to that of the input signal with two exceptions. First, it is shifted by a time interval equal to the period of the shift signal, and second, it contains within itself signal variations indicative of the clock rate of the shift signal. In addition, between the broader ON pulses in the OFF period appear certain brief positive pulses 59 which, however, are too brief to pass through the time delay network 38*b*, 39*b* of the next stage as an ON signal. The output signal of tunnel diode 31*a* becomes, of course, the input signal for the next succeeding stage. The waveform of the signal appearing across the next succeeding tunnel diode 31*b* is therefore identical to curve 58 except that it is delayed by an additional interval of time equal to the period of the shift signal 52.

In those applications where it is desired to eliminate positive pulses 59 appearing in the output signals of the tunnel diodes as seen in FIGURE 4, a minor variation of the circuitry will accomplish this. This variation is shown in FIGURE 5. Again, each tunnel diode 61 is connected in series with a resistor 62 across a source of direct current potential represented by conductors 63 and 64 to operate the tunnel diodes in a switching mode between their bistable states. Input signals to each stage are applied through resistor 65 and clock or shift signals similar to those previously discussed are supplied by shift signal source 66. The input and clock signals are also applied through a double diode gate circuit 67 connected, however, somewhat differently than in the previous example. Here the input ends of diodes 68 and 69 are connected to one terminal of the capacitor 70 rather than on opposite sides of the capacitor as in the previous example. The other side of capacitor 70 is connected to the shift signal source 66 through conductor 71.

In this example the connection of diodes 68 and 69 in back-to-back arrangement prevents the shift signal from changing the state of the tunnel diodes except when the input signal to a tunnel diode is representative of digital bit information different in nature from the bit already stored by the tunnel diode. Thus when the tunnel diode is OFF and an incoming signal represents a zero or OFF bit of information, the shift signal is prevented by the double diode gate circuit from turning the tunnel diode rapidly ON and then OFF. The intervals between ON signals are therefore uninterrupted by sharp pulses in the waveform such as by pulses 59 in FIGURE 4. Otherwise the characteristics of the circuit shown in FIGURE 5 are similar to those shown in FIGURE 3.

Figure 6:
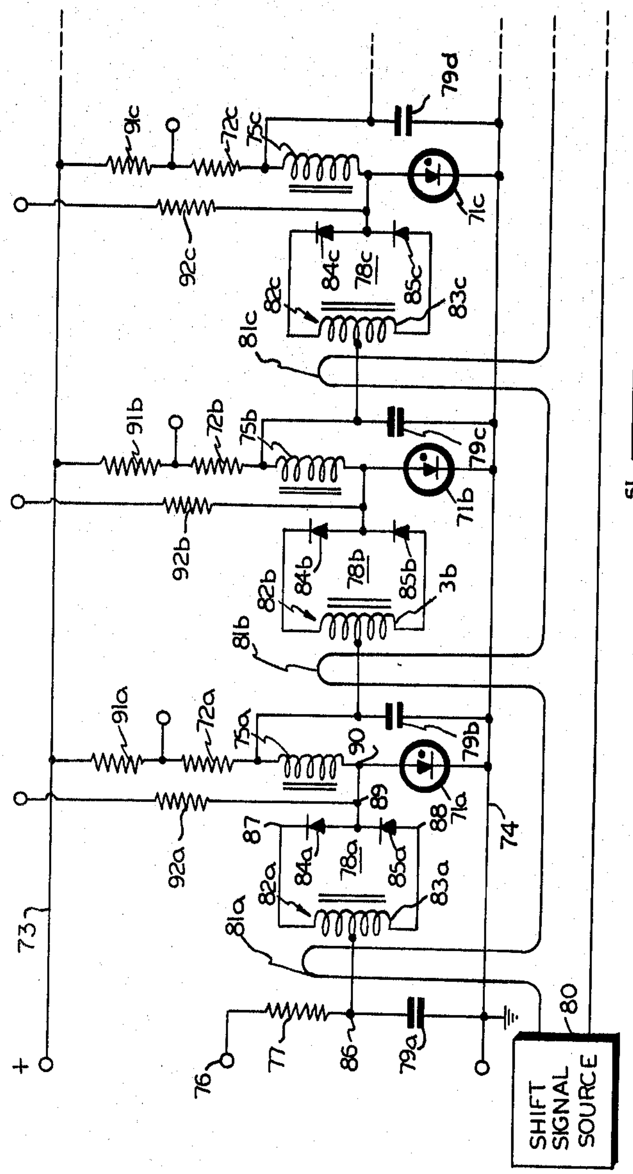
FIGURE 6 is a schematic diagram of a preferred embodiment of the invention.

In FIGURE 6 is represented a preferred form of shift register circuit constructed in accordance with the principles of this invention. As shown therein, each stage incorporates a tunnel diode 71 connected in series with a resistor 72 across a source of direct current potential represented by conductors 73 and 74. In series circuit between each of the tunnel diodes 71 and resistor 72 is an inductor 75, the significance of which will be described below. The positive resistance in the tunnel diode series circuit and the magnitude of the applied source of direct current potential is selected to cause switching modes of operation of the tunnel diode between stable conditions. The additional energy required to trigger the switching action is supplied by signals applied through terminal 76 to an input circuit including resistor 77 and gate circuit **78*a*. Capacitor 79*a* forms with resistor 77 a time delay network which has a period approximately equal to one-half the time width of one bit of information. The application of the incoming input signals from the RC network is controlled by gate circuit 78*a* in accordance with clock or shift signals applied to it from the shift signal source 80. These shift signals are introduced into the gate circuit of each stage through primary windings 81 of transformers 82, causing a potential of alternating polarity to appear across the center-tapped secondary windings 83 of these transformers. The time delay network made up of resistor 77 and capacitor 79*a* is connected to introduce the input signal to the center tap of transformer secondary winding 83*a*** so that no potential difference due to the input signal is developed across the secondary winding.

Connected from opposite ends of the transformer secondary winding **83*a* to the positive potential side of tunnel diode 71*a* are a pair of circuit branches including diodes 84*a* and 85*a* respectively. With reference to the input signal applied to the center tap of transformer winding 83*a*, diodes 84*a* and 85*a* are oppositely poled, whereas with respect to potentials developed across the transformer secondary winding 83*a* these diodes are poled to conduct in one and the same direction. The potential developed across the secondary winding of the transformers causes alternate conduction and cut off of diodes 84 and 85. When these diodes are in a state of condition, the input signals applied through the gate circuits are sampled and transferred to the tunnel diodes 71. When the diodes 84 and 85 are cut off, however, the tunnel diodes 71** remain in whatever state they had been placed by the input signals previously applied.

It is to be noted that the signal levels within the circuit of FIGURE 6 are preferably low for a number of reasons. First of all it is not necessary to employ high level signals in a logic circuit of this nature. Secondly, by employing low energy level signals and tunnel diodes capable of handling such signals, the speed of operation of the circuit may be increased. I have preferred to employ in the circuit shown in FIGURE 6 tunnel diodes which can be triggered to their ON state by raising the potential across them to 0.05 volt and which can be triggered to the OFF state by lowering the potential drop to 0.4 volt. Signals of such levels perform particularly well in the double diode gate circuits. Diodes 84 and 85 possess, as do most diodes, an intrinsic barrier to forward currents such that a certain forward bias voltage must be developed across them before significant currents begin to flow in the diodes. When such diodes operate with higher level potentials and currents their intrinsic forward barrier presents a negligible influence on the operation of the associated circuits. At the low signal levels preferably employed in circuits of the type described herein, however, the intrinsic barrier's influence is significant and desirable. The effect of the intrinsic barrier is to provide a reverse bias upon diodes 84 and 85 which prevents the diodes from conducting the instant that a positive potential is applied across them by the shift signal introduced into the gate circuit 78. Consequently, a positive shift signal pulse must rise to a potential equal to the threshold levels of the diodes before forward conduction occurs. This effect shortens the interval during each cycle of the shift signal during which the gate circuit is open to incoming signals and sharpens the trigger pulse applied to the tunnel diode in a manner which results in precision of the switching operation by the tunnel diodes.

Also to be noted in FIGURE 6 is the manner in which the shift signals are coupled into the gate circuit. By connecting the primary windings 81 of the coupling transformers in series the clock signals are applied without phase shift to all stages of the circuit simultaneously. This becomes a very important consideration at high clock rates in the megacycle ranges and contributes significantly to the precision and speed of operation of the circuit. The speed of operation, it should be pointed out, is dependent primarily upon the frequency of the shift signal source, not upon the delay time of the time delay circuit. The delay period of the time delay circuit is not critical. It is only necessary that at the start of a cycle the incoming signal is not permitted to pass through the gate circuit and at the end of the cycle the delay circuit has permitted the incoming signal to rise to a level sufficient to pass through the gate circuit and change the state of the tunnel diode.

Figure 7:
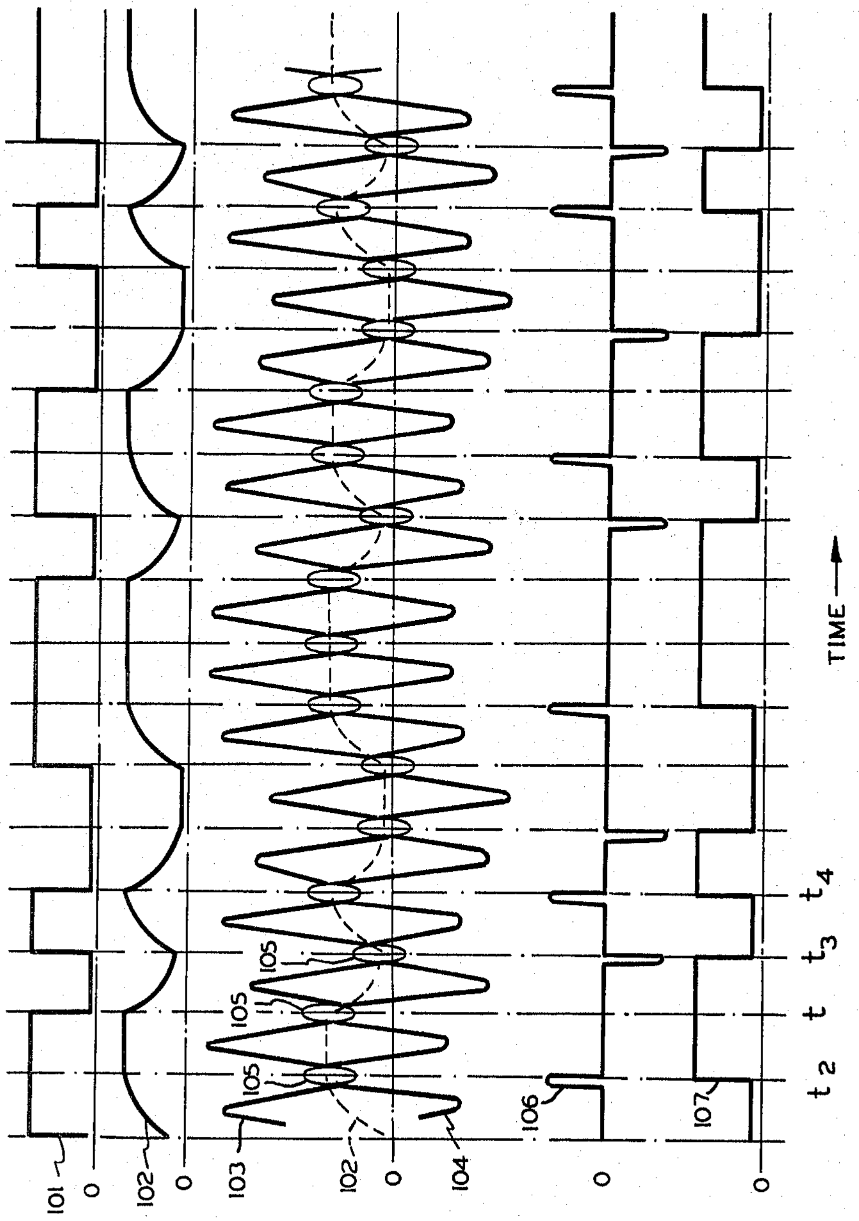
FIGURE 7 is a diagrammatic representation on a common time scale of certain potentials and currents appearing in the circuit illustrated in FIGURE 6.

The manner in which the circuit shown in FIGURE 6 operates will be better appreciated when it is considered in connection with the signal waveforms shown on a common time scale in FIGURE 7. There, input signal 101 represents an input signal potential appearing at terminal 76 in FIGURE 6. This input signal is modified in shape and delayed by the time delay network to produce a waveform, as shown at 102 which represents the potential appearing at point 86 in FIGURE 6. The waveform of potentials which appear at points 87 and 88 in FIGURE 6 are the algebraic sum of the modified input signals 102 and the clock or shift signals coupled into the gate circuit **78*a* by transformer 82*a***. The shift signals in this embodiment can be pure sine waves and need not be of the spaced pulse type discussed in connection with the previous examples. The phase of the shift signal is adjusted so that diodes 84 and 85 conduct at the start of each bit of information contained in the input signal. Because of the phasing the potentials appearing at point 87 resemble curve 103 and those at point 88 resemble waveform 104. The latter two curves or waveforms are plotted together on the same ordinate axis to illustrate their relative effects on the gate circuit. The periods during which the gate circuit is open to the passage of input signals are represented by the overlapping portions 105 of the two curves 103 and 104. During these periods, an input signal current is permitted to flow through the gate circuit if and only if an ON signal finds the tunnel diode in an OFF condition or if an OFF signal finds the tunnel diode in an ON condition.

The currents which flow in conductor 89 of FIGURE 6 under such conditions are represented by the pulsed waveform 106. These current pulses turn the tunnel diode ON when they are positive and OFF when they are negative, thereby resulting in producing potentials at point 90 such as those represented by waveform 107. It is to be noted that the latter waveform 107 reproduces the original input signal waveform 101 with the exception that it is shifted by a period of one bit of information; i.e., by the period of the shift or clock signal.

The output signal from tunnel diode *71a* appears as an input signal to the next stage at point 90 with a waveform indicated by curve 107 of FIGURE 7. The time delay network represented by inductor *75a* and capacitor *79b* convert this input signal to a form precisely that of waveform 102 in FIGURE 7, with the exception, of course, that it is further delayed by one bit of information. Inductor 75, in addition to functioning as part of the time delay network, serves another purpose as well. Its value can be selected to tune out the capacitance in tunnel diode 71 and minimize ringing in the circuit which is a limiting factor on the speed at which the circuit can be designed to operate.

The condition of the shift register circuit and the nature of the information stored within it may be read out of the circuit by different methods. One way in which this can be accomplished is to include in direct series relationship with each of resistors 72 a low ohmic value resistor 91 to provide a low voltage low impedance output across which a signal may be derived. Alternatively, a high ohmic value resistor 92 can be connected directly to the positive potential side of the tunnel diode to provide a high impedance read-out signal.

Shift registers of the type described herein are capable of operating at unusually high shift rates. I have been able to operate such circuits at frequencies of 1000 megacycles and higher. Recommended components for a circuit configuration such as is shown in FIGURE 6 for operation at 100 megacycle shift rates are as follows:

| | |
|---|---|
| Tunnel diodes 71 | (1) |
| Diodes 84 and 85 | (2) |
| Transformer 82, microhenry | .22 |
| Inductors 75, microhenry | .04 |
| Resistor 77, ohms | 47 |
| Resistors 72, ohms | 27 |
| Resistors 91, ohm | 1 |
| Resistors 92, ohms | 470 |
| Capacitors 79, micromicrofarads | 100 |

[1] IN 3129 available from R.C.A.
[2] Q6–100 available from International Diode Corp.

It is to be understood, of course, that the circuits specifically disclosed herein are offered by way of illustration of the principles of this invention, and that they should not be interpreted necessarily as limiting the application of these teachings. Variations other than those illustrated and described will doubtless occur to those skilled in the art to which the invention pertains. For example, such circuits can be operated from a source of negative potential instead of from a positive potential source as illustrated, although it would then be necessary to reverse the polarity of the tunnel diodes to do so. These and other such variations as fall within the true spirit and scope of the invention are intended to be covered by the following claims.

1. A shift register stage comprising:
an input circuit including a time delay network for delaying digital information signals introduced into said input circuit;
a gate circuit including a pair of oppositely poled diodes connected in parallel to receive information signals from said input circuit;
means for rendering said gate circuit alternately conductive and nonconductive to information signals received from said input circuit including means for coupling into said gate circuit a shift signal of periodically reversing polarity to apply a periodic reverse bias to said pair of diodes, such that one diode is biased to conduct when the other is biased to be nonconductive;
an information storage circuit including
a tunnel diode and means for causing said tunnel diode to switch between its higher voltage ON state and its lower voltage OFF state in response to information signals passing through said gate circuit.

2. A shift register circuit comprising:
a power supply circuit including a pair of conductors adapted to be energized from a source of direct current potential; and
a plurality of symmetrical consecutively arranged information shifting stages forming an ordered array, each stage including
a switching diode having high and low voltage operating states and a negative resistance characteristic therebetween,
means for biasing said switching diode for bistable switching operation between its high and low voltage operating states including a resistor connected in series with said switching diode across said pair of conductors,
an input circuit including a time delay network for receiving and delaying digital signals,
a gate circuit comprising a pair of circiut branches connected in parallel between said input circuit and said switching diode, said circuit branches including diodes of respectively opposite polarities, and
means for coupling into said gate circuit a gating signal of periodically reversing polarity to apply an intermittent reverse bias to the diodes in said pair of circuit branches, such that one diode is biased to conduct when the other is biased to be nonconductive, thereby to open and close said gate circuit to the passage of input signals at spaced time intervals.

3. A shift register circuit comprising:
a power supply circuit including a pair of conductors adapted to be energized from a source of direct current potential; and
a plurality of symmetrical consecutively arranged information shifting stages forming an ordered array, each stage including
a series circuit including a tunnel diode and a resistive circuit element connected across said pair of conductors, the total positive resistance in said series circuit being larger than the negative resistance of said tunnel diode, and
an input circuit connected to vary the potential across said tunnel diode to switch it between its higher voltage ON stage and its lower voltage OFF stage, said input circuit including a pair of parallel-connected circuit branches each including a diode, said diodes being connected in opposite current-carrying directions;
means for controlling the conductive periods of said input circuit including a source of alternating polarity shift signals connected to periodically impose a reverse bias on the diodes in the input circuit of each stage, such that one diode is biased to conduct when the other is biased to be nonconductive, and a time delay network connecting the input circuit to receive ON and OFF potentials from the tunnel diode in the next preceding stage in the array.

4. A shift register circuit comprising:

a power supply circuit including a pair of conductors adapted to be energized from a source of direct current potential; and a plurality of symmetrical consecutively arranged information shifting stages forming an ordered array, each stage including a tunnel diode, a series circuit including said tunnel diode and a resistive circuit element connected across said pair of conductors, the total positive resistance in said series circuit being larger than the negative resistance of said tunnel diode, an input circuit connected to vary the potential across said tunnel diode to switch it between its higher voltage state and its lower voltage state, said input circuit including a pair of parallel-connected circuit branches each including a diode, said diodes being connected in opposite current-carrying directions, means for applying input signals to said input circuit, means for controlling the conductive periods of said input circuit and for timing the application of said input signals to said tunnel diode including a source of alternating polarity shift signals connected to periodically impose a reverse bias on the said diodes in said input circuit, such that one diode is biased to conduct when the other is biased to be nonconductive, and time delay circuit means connecting the input circuit to receive potentials from the tunnel diode in the next preceding stage in the array.

5. A shift register circuit comprising:

a power supply circuit including a pair of conductors adapted to be energized from a source of direct current potential; and a plurality of symmetrical consecutively arranged information shifting stages forming an ordered array, each stage including a switching diode having high and low voltage operating states and a negative resistance characteristic therebetween;

means for biasing said switching diode for bistable switching operation between its high and low voltage operating states including a resistor connected in series with said switching diode across said pair of conductors, an input circuit including a time delay network for receiving and delaying digital signals, a gate circuit comprising a pair of circuit branches connected in parallel between said input circuit and said switching diode, said circuit branches including diodes of respectively opposite polarities, means for coupling into said gate circuit a gate signal of periodically reversing polarity to apply an intermittent reverse bias to the diodes in said pair of circuit branches thereby to open and close said gate circuit to the passage of input signals at spaced time intervals, such that one diode is biased to conduct when the other is biased to be nonconductive, and means for transmitting high and low voltage signals derived from said switching diode indicative of the state of said switching diode to the input circuit of next succeeding stage in the array.

6. A shift register circuit comprising:

a plurality of symmetrical consecutively arranged information shifting stages forming an ordered array, each stage including a time delay network for receiving digital information signals and for delaying the passage of such signals therethrough, a gate circuit for receiving delayed digital information signals from said time delay network and for controlling the the passage of such signals therethrough including a pair of diodes connected in parallel and poled in opposite current-carrying directions, a storage circuit for receiving the delayed digital signals passing through said gate circuit including a tunnel diode biased to operate in a bistable switching mode in response to said delayed digital information signals, means for coupling into said gate circuit a signal of alternately reversing polarity to apply a periodic reverse bias to said pair of diodes, such that one diode is biased to conduct when the other is biased to be nonconductive, thereby closing and opening said gate circuit at spaced time intervals to the passage of signals therethrough; and means for introducing into the time delay network a digital signal indicative of the information registered by the tunnel diode in the next preceding stage.

7. A shift register circuit comprising:

a source of shift signals of periodically reversing polarity;

a power supply circuit including a pair of conductors adapted to be energized from a source of direct current potential; and a plurality of symmetrical consecutively arranged information shifting stages forming an ordered array, each of said stages including a tunnel diode, a series circuit including said tunnel diode and a resistor connected across said pair of conductors, the total positive resistance in said series circuit being larger than the negative resistance of said tunnel diode to bias said tunnel diode for switching action between an ON state and a lower voltage OFF state, a coupling transformer having a primary winding connected to said source of shift signals and a center-tapped secondary winding, a pair of circuit branches connected from opposite ends of said secondary winding to a point in said series circuit between said tunnel diode and said resistor, said circuit branches including a pair of diodes of respectively opposite polarities, a time delay network connected between the central tap of said secondary winding and a point in the series circuit in the next preceding stage of the array to receive signals from the preceding stage in response to a change of state of the tunnel diode therein.

8. A shift register circuit comprising:

a source of shift signals of periodically reversing polarity;

a power supply circuit including a pair of conductors adapted to be energized from a source of direct current potential; and a plurality of symmetrical consecutively arranged information shifting stages forming an ordered array, each of said stages including a tunnel diode, a series circuit including said tunnel diode and a resistor connected across said pair of conductors, the total positive resistance in said series circuit being larger than the negative resistance of said tunnel diode to bias said tunnel diode for switching action between an ON state and a lower voltage OFF state, a coupling transformer having a primary winding connected to said source of shift signals and a center-tapped secondary winding, a pair of circuit branches connected from opposite ends of said secondary winding to a point in said series circuit between said tunnel diode and said resistor, said circuit branches including a pair of diodes of respectively opposite polarities, a time delay network connected between the central tap of said secondary winding and a point intermediate the tunnel diode and the resistor in the series circuit in the next preceding stage of the array to receive signals from the preceding stage in response to a change of state of the tunnel diode therein.

References Cited by the Examiner

UNITED STATES PATENTS

| | | | |
|---|---|---|---|
| 2,861,216 | 11/1958 | England | 328—27 |
| 3,088,096 | 4/1963 | Steinbuck | 307—88.5 |
| 3,097,312 | 7/1963 | Miller | 307—88.5 |
| 3,162,776 | 12/1964 | Gerlack et al. | 328—37 |

OTHER REFERENCES

"The Physical Realization of An Electronic Digital Computer" by Booth, in vol. 22, issue 274 of Electronic Engineering, 12–1950, pages 492–498.

"RC Coupled Tunnel Diode Shift Register," by Groudis, col. 2, No. 6, 4–1960 IBM Technical Disclosure Bulletin, page 102.

ARTHUR GAUSS, *Primary Examiner.*

JOHN W. HUCKERT, *Examiner.*

R. H. EPSTEIN, *Assistant Examiner.*